(No Model.)

J. McANESPEY.
COFFEE POT.

No. 258,786. Patented May 30, 1882.

WITNESSES:
C. Neveux
C. Sedgwick

INVENTOR:
J. McAnespey
BY Munn & Co.
ATTORNEYS.

UNITED STATES PATENT OFFICE.

JOHN McANESPEY, OF PHILADELPHIA, PENNSYLVANIA.

COFFEE-POT.

SPECIFICATION forming part of Letters Patent No. 258,786, dated May 30, 1882.

Application filed April 5, 1882. (No model.)

*To all whom it may concern:*

Be it known that I, JOHN McANESPEY, of Philadelphia, in the county of Philadelphia and State of Pennsylvania, have invented a new and useful Improvement in Coffee-Pots, of which the following is a full, clear, and exact description.

Reference is to be had to the accompanying drawings, forming a part of this specification, in which similar letters of reference indicate corresponding parts in both the figures.

Figure 1:
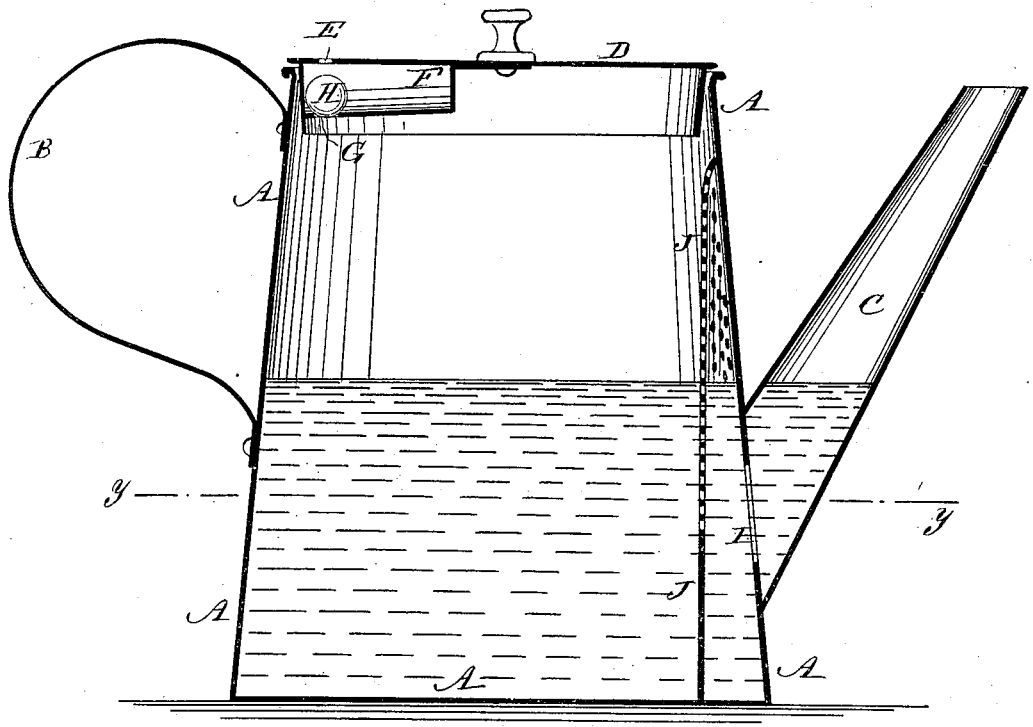
Figure 2:
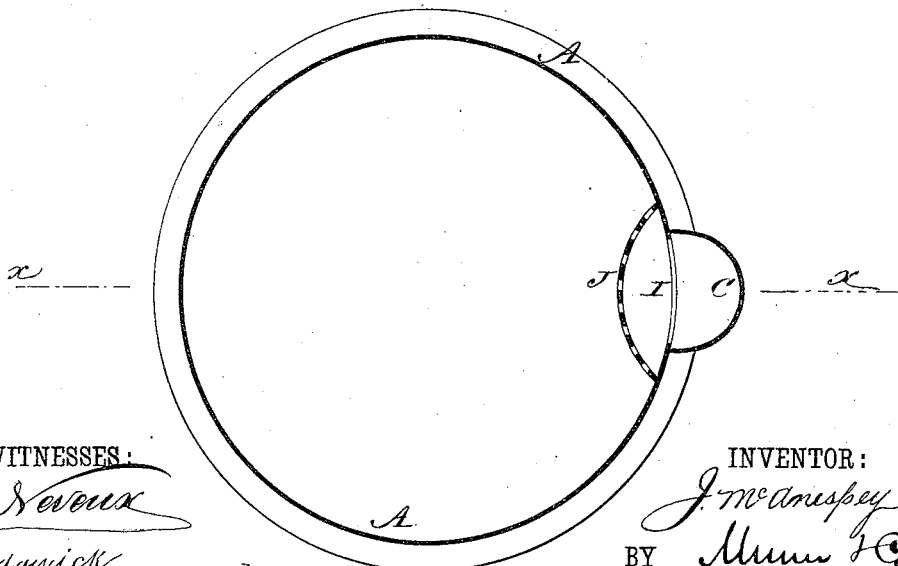

Figure 1 is a sectional side elevation of my improvement, taken through the line $xx$, Fig. 2. Fig. 2 is a sectional plan view of the same, taken through the line $yy$, Fig. 1.

The object of this invention is to prevent the escape of "grounds" or sediment when pouring coffee from coffee-pots.

The invention consists in a coffee-pot made with a body provided with an upright plate finely perforated in its upper part and secured at its edges to the sides of the pot in such a position as to cover the part of the said body through which is formed the perforation leading to the spout, as will be hereinafter fully described.

A represents the body of a coffee-pot, which is provided with a handle, B, and a spout, C, in the ordinary manner.

D is the cover, which is provided with an inwardly-projecting flange to fit into the mouth of the pot A. In the cover D, near its flange, is formed a perforation, E, and to the under side of the cover D is attached a semi-cylindrical keeper, F, which is placed in a radial position, and inclines upward from its outer to its inner end. In the keeper F, directly beneath the aperture E, is formed an aperture, G, and within the keeper F is placed a ball, H. With this construction, when the coffee-pot is in an upright position the ball H rests in the outer part of the keeper F and closes the aperture G, so that the aroma of the coffee cannot escape. When the coffee-pot A is inclined forward in pouring out coffee the ball H rolls forward into the forward part of the keeper F, so that air can readily pass through the apertures E G to take the place of the coffee poured out. In the side of the coffee-pot A, within the inner end of the spout C, is formed a large aperture, I, through which the coffee enters the spout C.

J is a plate of sheet metal, extending from the bottom of the pot A nearly to its top. The plate J is bent at about the same curve as the side of the pot A, and its edges are soldered to the side of the said pot. The plate J, from about the level of the discharge-aperture I to the upper end, is finely perforated, as shown in Figs. 1 and 2. With this construction, when the pot A is inclined to pour out coffee the grounds are kept back by the solid lower part of the plate J, while the coffee passes through the perforations of the said plate and then out through the aperture I and spout C.

I am aware that it is not new to use a vertical side-perforated tube attached to the middle of cover to contain the coffee or tea, or to combine a perforated sheet in the spout with a shelf and superposed perforated cap; but

What I claim is—

A coffee-pot whose body is provided with a finely-perforated upright plate, J, and the aperture I, leading to the spout, the plate J being solid at its lower part, whereby the coffee-grounds are kept back and prevented from flowing out with the liquid, as described.

JOHN McANESPEY.

Witnesses:
ELLEN McANESPEY,
EDMOND J. McANESPEY.